United States Patent [19]
Deak et al.

[11] Patent Number: 5,662,418
[45] Date of Patent: Sep. 2, 1997

[54] HIGH TEMPERATURE PROBE

[75] Inventors: Anton F. Deak, Nussbaumen, Switzerland; Dieter Glaser, Lorsch, Germany; Caroline Marchmont, Tegerfelden, Switzerland; Ung-Lap Ngo-Beelmann, Karlsruhe, Germany

[73] Assignee: Asea Brown Boveri AG, Baden, Switzerland

[21] Appl. No.: 496,412

[22] Filed: Jun. 29, 1995

[30] Foreign Application Priority Data

Sep. 2, 1994 [DE] Germany ............... 44 31 291.1

[51] Int. Cl.$^6$ ..................... G01K 1/08
[52] U.S. Cl. ..................... 374/144; 374/208
[58] Field of Search ............... 374/135, 138, 374/144, 147, 148, 179, 180, 181, 182, 208; 136/230, 231, 232, 233

[56] References Cited

U.S. PATENT DOCUMENTS

| | | | |
|---|---|---|---|
| 4,018,624 | 4/1977 | Rizzolo | 374/179 |
| 4,467,134 | 8/1984 | Pustell | 374/144 |
| 4,721,534 | 1/1988 | Phillippi et al. | 374/179 |
| 4,865,462 | 9/1989 | Broomfield | 374/179 |
| 4,987,749 | 1/1991 | Baier | 374/148 |
| 5,161,894 | 11/1992 | Bourigault | 374/135 |
| 5,180,227 | 1/1993 | John et al. | |
| 5,456,761 | 10/1995 | Auger et al. | 374/179 |
| 5,520,461 | 5/1996 | Curry et al. | 374/144 |

FOREIGN PATENT DOCUMENTS

| | | |
|---|---|---|
| 1015238 | 9/1957 | Germany . |
| 1834764 | 4/1960 | Germany . |
| 2413909 | 10/1974 | Germany . |
| 2549619 A1 | 5/1977 | Germany . |

*Primary Examiner*—G. Bradley Bennett
*Attorney, Agent, or Firm*—Oblon, Spivak, McClelland, Maier & Neustadt, P.C.

[57] ABSTRACT

In a high temperature probe (10), in particular for use in the hot gas stream of a gas turbine at temperatures of up to 1200° C., which high temperature probe (10) comprises a metallic probe tube (11) having an internal drilled hole (12, 13) running in the direction of the tube axis of the probe tube (11) and a measurement space arranged at the lower end, which measurement space is separated from the internal drilled hole (12, 13) by a constriction (16a, b) and is in contact with the surroundings of the probe tube (11), and which high temperature probe (10) furthermore comprises at least one thermocouple (31, 32) which is conducted downwards in an insulated manner in the internal drilled hole (12, 13) and through the constriction (16a, b) into the measurement space, a high accuracy at a low time constant is achieved by the measurement space being configured as a flow-through channel (15) for the hot gases to be measured, which channel is oriented at right angles to the direction of the tube axis and runs through the probe tube (11) with one internal width (W), and by the thermocouple (31, 32), of which there is at least one, being arranged with its connection point (47) within the flow-through channel (15).

19 Claims, 3 Drawing Sheets

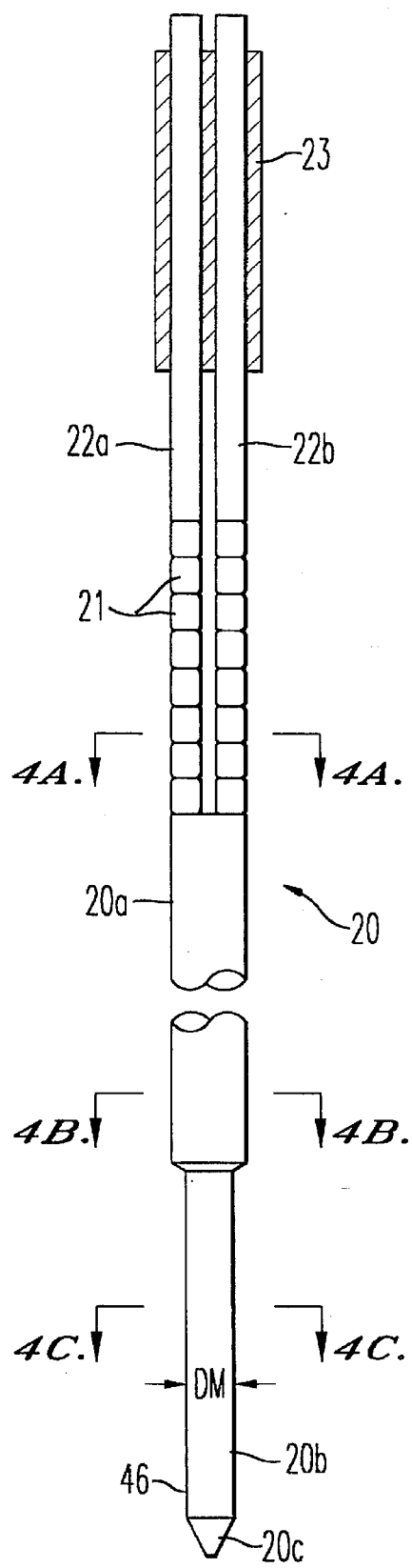
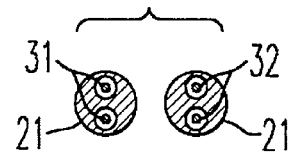
FIG. 4A
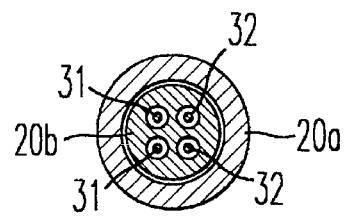
FIG. 4B
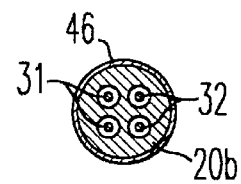
FIG. 4C
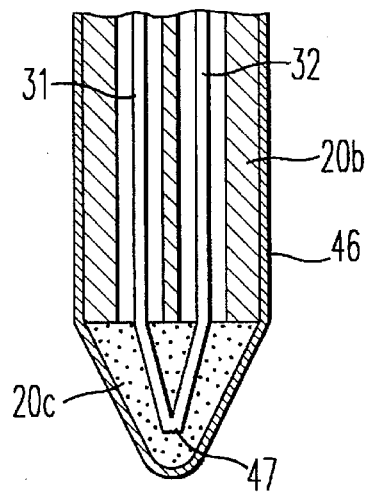
FIG. 4D
FIG. 3

HIGH TEMPERATURE PROBE

BACKGROUND OF THE INVENTION

1. Field of the Invention

The present invention relates to the field of temperature measurement technology. It concerns a high temperature probe, in particular for use in the hot gas stream of a gas turbine at temperatures of up to 1200° C., comprising a metallic probe tube having an internal drilled hole running in the direction of the tube axis of the probe tube and a measurement space arranged at the lower end, which space is separated from the internal drilled hole by a constriction and is in contact with the surroundings of the probe tube, and also at least one thermocouple which is conducted downwards in an insulated manner in the internal drilled hole and through the constriction into the measurement space.

Such a high temperature probe is known, for example, from the publication DE-A-2 413 909.

2. Discussion of Background

In the operation of gas turbines it is usually necessary to measure the temperature of the hot combustion gases, which can be from a few 100° C. to above 1200° C. For this purpose, there have already been proposed high temperature probes which can be inserted into appropriate openings in the hot gas housing of the turbine and project into the hot gas stream by means of a probe tube which contains the actual measuring element at the lower end.

Thus, the publication U.S. Pat. No. 5,180,227 discloses a high temperature probe which operates optically and in which an optical sensor element of sapphire is arranged in a measurement space formed at the lower end of the probe tube. The measurement space is connected with the surrounding hot gas space via an inlet opening fitted below the sensor element and an outlet opening fitted at the level of the sensor element. The gas entering from the hot gas stream through the inlet opening is, owing to the arrangement, braked in the measurement space and flows around the sensor element at a very low velocity before again leaving through the outlet opening. The measurement space is therefore also known as a "stagnation chamber". The probe can be used up to temperatures of 1300° C. and is cooled in the upper part of the probe tube by means of air or another gas which is fed in at the probe flange and is allowed to leave again just above a thermal barrier which separates the sensor element from the upper part of the probe.

Furthermore, the publication mentioned in the introduction discloses a high temperature probe for use in gas turbine aircraft engines at temperatures up to 800° C., which probe operates using a thermocouple as temperature sensor. The thermocouple is conducted in a metal-sheathed cable having mineral insulation downwards into a probe tube and through a sealing constriction into a measurement space so that the connection point between the two wires of the thermocouple is arranged approximately in the middle of the measurement space. Here too, contact with the hot gases to be measured is achieved by provision of an inlet opening fitted below the connection point and an outlet opening fitted above the connection point, which openings connect the measurement space with the surrounding hot gas space. Here too, the hot gas is held up and calmed in the measurement space by the arrangement and configuration of the openings.

In the known probes, the hot gas to be measured is strongly braked in respect of its flow velocity and is brought into contact with the respective sensor element in an almost static state. This reduces the heat transfer between gas and sensor element, which shows up in an increased time constant and a greater deviation between actual and measured temperature.

SUMMARY OF THE INVENTION

Accordingly, one object of the invention is to provide a novel high temperature probe of the type mentioned in the introduction which enables the heat transfer between gas and sensor element and thus the properties of the probe to be considerably improved.

This object is achieved in a probe of the type mentioned in the introduction by the measurement space being configured as a flow-through channel for the hot gases to be measured, which channel is oriented at right angles to the direction of the tube axis and runs through the probe tube with one internal width, and by the thermocouple, of which there is at least one, being arranged with its connection point within the flow-through channel.

The specific configuration of the measurement space as a flow channel through which the hot gases can flow virtually unhindered and flow past the sensor element enables an optimum heat transfer between gas and sensor element to be achieved, which at the same time reduces the interfering secondary influences such as heat conduction via the probe tube and the like.

A first preferred embodiment of the probe of the invention has the flow-through channel bounded at the sides by walls of the probe tube, which walls form a radiation protection shield. By this means, the interfering influences of the environment on the measurement result can be further reduced.

A second preferred embodiment of the probe of the invention has the thermocouple, of which there is at least one, being conducted downwards in the internal drilled hole of the probe tube in a first ceramic tube of $Al_2O_3$ provided with appropriate through holes, with the connection point of the thermocouple being located at the lower end of the first ceramic tube, and has the first ceramic tube projecting through the constriction into the flow-through channel. By this means, the long-term stability of the measuring arrangement is considerably improved.

A further increase in the long-term stability is obtained if, according to a further preferred embodiment of the probe of the invention, the thermocouple, of which there is at least one, is a PtRh thermocouple, if means are provided for oxygen to flow around the thermocouple, of which there is at least one, in the part above the constriction during use of the high temperature probe, and if at least that part of the first ceramic tube and of the thermocouple, of which there is at least one, around which the hot gas flows is surrounded by a sheathing of PtRh.

In a further preferred embodiment of the invention, the probe tube is made of an oxide-dispersion-strengthened (ODS) superalloy based on iron and having a high chromium and aluminum content. Such an alloy is obtainable, for example, under the designation PM 2000 from PM Hochtemperatur-Metall GmbH (material number 1.4768). With such a probe tube, the probe has a long lifetime even at temperatures up to 1200° C. owing to the high creep and very good oxidation and corrosion resistance of the alloy.

Further embodiments are given in the attendant claims.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 shows several cross sections through the lower part of the probes according to FIG. 1 along the lines A—A (FIG. 2a), B—B (FIG. 2b) and C—C (FIG. 2c);

FIG. 3 shows an enlarged side view of the actual probe element of the probe according to FIG. 1;

FIG. 4 shows several cross sections along the lines D—D (FIG. 4a), E—E (FIG. 4b) and F—F (FIG. 4c), and also an enlarged longitudinal section (FIG. 4d) through the tip, of the probe element according to FIG. 3.

DESCRIPTION OF THE PREFERRED EMBODIMENTS

Before the invention is described in detail with the aid of the drawings, an outline should first be given of the operation conditions in a typical gas turbine to which a high temperature probe of the present type is exposed:

Wall temperature=900° C.

Gas temperature=up to 1200° C.

Gas pressure=20 bar

Gas velocity=150 m/s (max. 200 m/s)

Oxygen content=15% (min. 10%).

Figures 1, 2A, 2B, 2C:
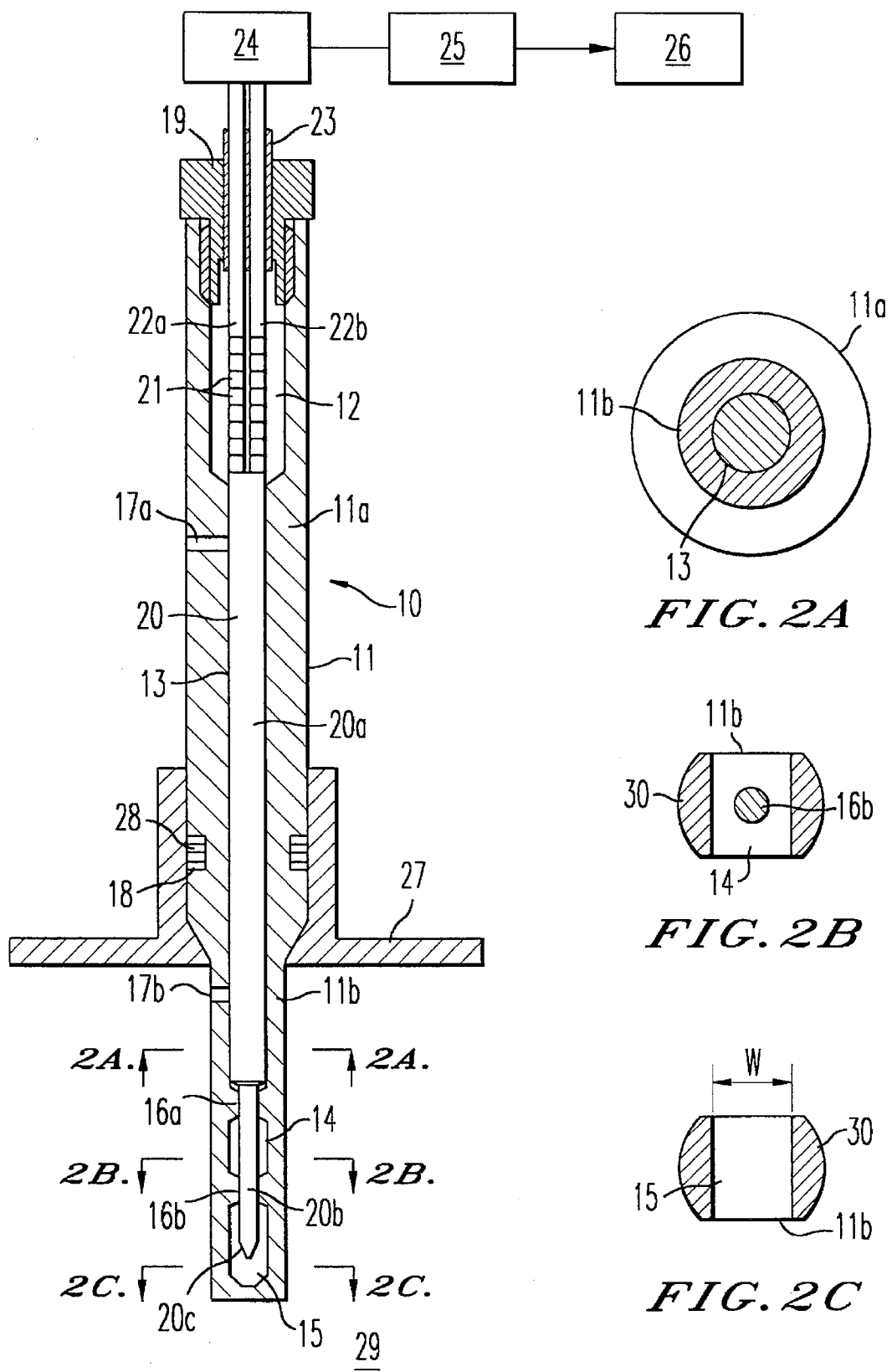
FIG. 1 shows a longitudinal section of the structure of a high temperature probe according to a first illustrative embodiment of the invention.

To make possible precise measurement of the gas temperature under these extreme operating conditions, to which are added vibrations and other mechanical stresses, at simultaneously high long-term stability and creep strength, a specific design of the high temperature probe is required, as is to be described first by way of the example of FIGS. 1 to 3.

Referring now to the drawings, wherein like reference numerals designate identical or corresponding parts throughout the several views, FIG. 1 shows a longitudinal section of the structure of a high temperature probe according to a first illustrative embodiment of the invention. The high temperature probe 10 essentially comprises a (cylindrical) probe tube 11 which is divided into a tube upper part 11a having a larger external diameter and a tube lower part 11b having a smaller external diameter. Just above the transition between the tube upper part 11a and the tube lower part 11b, the probe tube 11 is provided with an external circumferential annular groove 18 which can accommodate sealing rings 28. In the region of the annular groove 18, the probe tube 11 is held in a flange 27 by means of which it can be fixed in a detachable manner to the hot gas housing of a gas turbine.

Concentrically to the tube axis, there runs in the interior of the probe tube 11 a first internal drilled hole 12 which begins at the upper end and goes over into a second internal drilled hole 13 further down with reduction of the internal diameter. The second internal drilled hole 13 in turn goes over at the lower end of the probe tube 11 into two flow-through channels 14 and 15 lying behind one another which are oriented at right angles to the tube axis (see FIG. 2b and 2c) and are separated from one another and from the second internal drilled hole 13 by, in each case, a constriction 16a and 16b. In the installed state, the probe projects sufficiently far into the hot gas space 29 for the flow-through channels 14 and 15 to lie in the hot gas stream. The probe is here rotated about its axis in such a way that the hot gases to be measured flow in the channel direction through the flow-through channels 14, 15. In the case of FIG. 1, the gas flow is thus oriented perpendicular to the plane of the drawing.

Within the probe tube 11 there is arranged the actual probe element 20 which is again shown separately in side elevation in FIGS. 3 and 4. The probe element 20 comprises two ceramic tubes 20a and 20b of $Al_2O_3$ ceramic. The ceramic tube 20a is a hollow cylindrical tube and runs from the lower end of the first internal drilled hole 12 to the upper constriction 16a. The ceramic tube 20b is a cylindrical solid rod having four through holes arranged parallel to one another in the direction of the tube axis (see FIG. 4b and 4c). It runs from the lower end of the first internal drilled hole 12 to the middle of the lower flow-through channel 15 and there ends in a tube point 20c. Between the internal drilled hole 12 and the upper constriction 16a, it is concentrically surrounded by the ceramic tube 20a, while it runs free through the two constrictions 16a, b and the two flow-through channels 14, 15 and is surrounded only by a metallic sheathing 46 (FIG. 3 and 4d) of PtRh.

In the ceramic tube 20b or in the through holes thereof, for reasons of redundancy, two similar thermocouples (31 and 32 in FIG. 4b–d) are conducted downwards in the probe and end with their connection point 47 in the tube point 20c, where they are embedded in MgO or $Al_2O_3$ powder. The two thermocouples are preferably PtRh thermocouples of type B having a wire diameter of 0.5 mm. Above the ceramic tubes 20a, b, the wires of the thermocouples 31, 32 are, to achieve sufficient movability, conducted pair-wise through a group of ceramic beads 21 of $Al_2O_3$ arranged behind one another and each having two through holes (FIG. 4a).

The probe tube 11 is closed at the top with a lead-through 19 which can be screwed in and in which there is centrally inserted a lead-through tube 23 of Inconel having two through holes. The wires of the thermocouples 31, 32 are conducted through these through holes, with the wires being surrounded by sheathings 22a, b of "Alloy 600". Outside the high temperature probe 10, the wires are connected via a direct welded connection 24 (in FIG. 1 indicated by a box) to extension wires 25 (likewise indicated by a box) which are finally connected at the entrance of a measurement transducer 26.

As already described above, the ceramic tube 20b with the internal thermocouples 31, 32 runs across the two flow-through channels 14 and 15, completely or about to the middle. The external diameter DM of the ceramic tube 20b (FIG. 3) is here significantly smaller than the internal width W (FIG. 2c) of the flow-through channels 14, 15. The hot gases to be measured therefore flow virtually unhindered and without loss of velocity around the tube and the tube can thus very quickly and effectively take up heat from the gases and conduct it further to the internal thermocouples. In this way, a time constant of the thermocouples of $\tau < 1$ s is achieved. At the same time, differences between the actual and the measured gas temperature are small at $\Delta T_r = 9$ K (+/−30%). This is contributed to by, in particular, the walls 30 which bound the flow-through channels 14, 15 at the sides and form a radiation protection shield.

The high temperature probe 10 of FIG. 1 also has a high long-term stability: the drift is, at $\Delta T_{drift} = -2$ K after an operating time of 24,000 hours, very small. This is contributed to by the fact that the PtRh thermocouples are conducted upwards in the Al₂O₃ ceramic tubes 20a and 20b and that additionally there is the possibility of allowing O₂ to flow around the thermocouples in the probe tube, the oxygen being fed into the internal drilled hole 13 through an upper gas inlet opening 17a and being passed out again just above the first constriction 16a through a gas outlet opening 17b.

With an accuracy of the measuring system of $\Delta T_{system}$= +/−2 K (up to 1200° C.), the total uncertainty in the corrected measurement value is $\Delta T=\Delta T_{system}+\Delta T_{drift}+\Delta(\Delta T_r)=[-7K, +5K]$.

A particularly long lifetime of from 10,000 to 16,000 hours at the indicated operating temperatures, and indeed without any cooling, is obtained if the probe tube 11 comprises an oxide dispersion-strengthened (ODS) superalloy based on iron having a high chromium and aluminum content. Such an alloy for high temperature applications, which has a high creep and also a very good oxidation and corrosion resistance, is commercially available, for example, under the name PM 2000 (material number 1.4768). This alloy contains finely divided embedded Y₂O₃ particles which ensure a high creep resistance up to 1350° C. The good oxidation and corrosion properties result from a very dense and firmly adhering Al₂O₃ layer which forms on the material surface.

Figure 5:
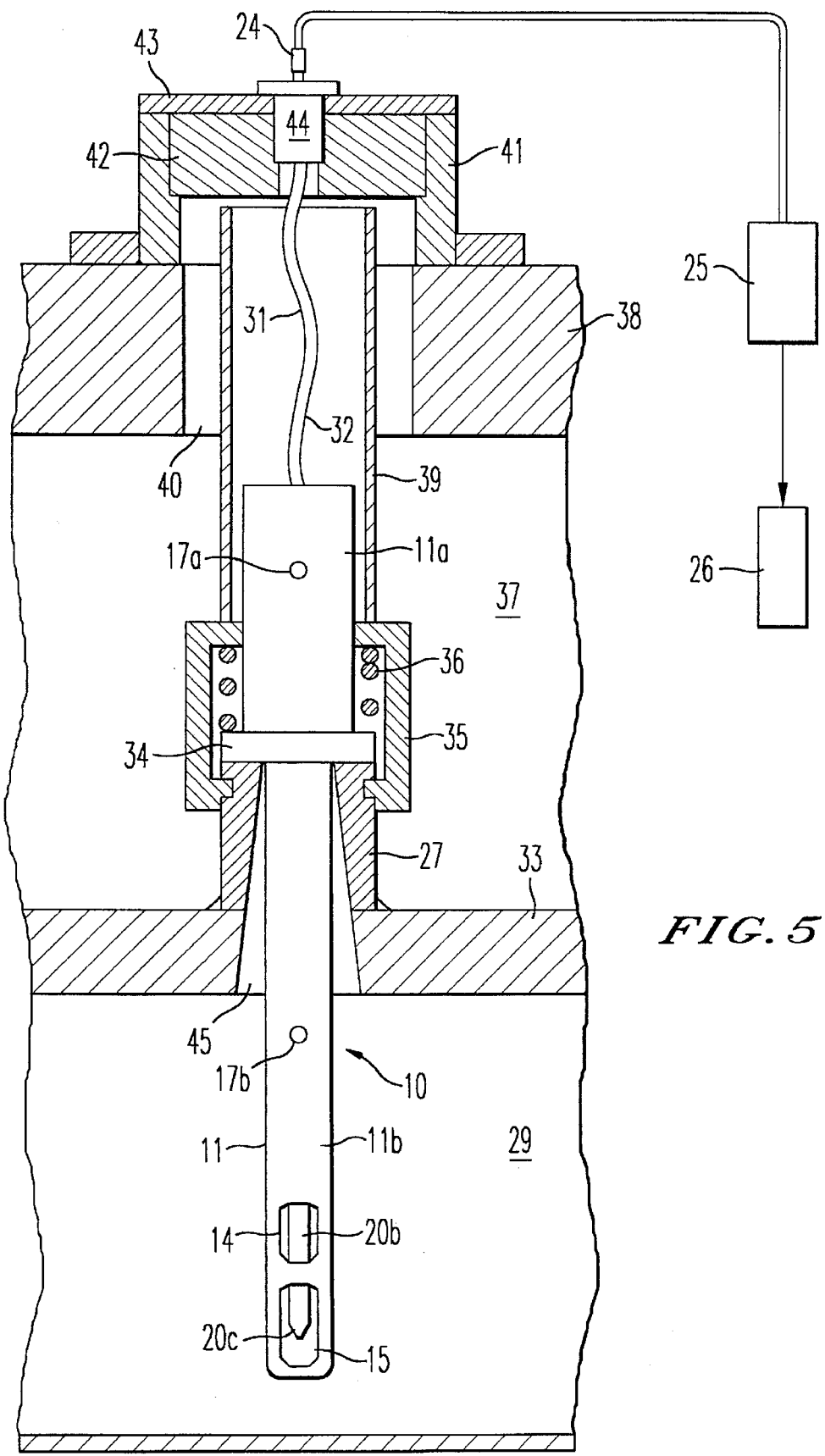
FIG. 5 shows a further illustrative embodiment of a probe of the invention with a bayonet fitting in the installed state in a gas turbine.

A further illustrative embodiment of a high temperature probe of the invention is shown in the installed state in a gas turbine in FIG. 5, with identical parts being provided with indentical reference numerals. The gas turbine has an external turbine housing 38 and an internal hot gas housing 33 which encloses the hot gas space 29. Between the turbine housing 38 and the hot gas housing 33 there is the so-called plenum 37. The probe tube 11 of the high temperature probe 10 is introduced into the hot gas space 29 through a probe opening 45 in the hot gas housing 33 and rests by means of an annular stop 34 on the upper rim of a flange 27 surrounding the probe opening 45. It is held in this position by a bayonet lock 35 which engages on the flange 27 and has an internal spring 36 which presses from above onto the stop 34.

Above the bayonet lock 35, the wires of the thermocouples 31, 32, which are conducted out of the tube upper part 11a, are conducted in a protective tube 39 through the plenum 37 and a probe opening 40 in the turbine housing 38 to the outside. On the outside of the turbine housing 38, there is attached by means of a flange a further protective tube 41 which surrounds the probe opening 40 and is closed off at the top by an insert 42 and lid 43. In the center of the insert 42 and lid 43 there is arranged a lead-through 44 through which the thermocouples are conducted to the outside and are there extended by means of the direct welded connection 24. The upper probe opening 40 is selected so as to be sufficiently large for the high temperature probe 10 together with the bayonet lock 35 to be able to be taken out in an upwards direction. This makes it possible to easily install and replace the probe without opening the turbine housing 38. In addition, owing to the flexible installation of the thermocouples 31, 32 in the protected tube 39, relative movement between turbine housing 38 and hot gas housing 33 is readily possible.

Overall, the invention provides a high temperature probe having high accuracy and long-term stability and also a long lifetime, which can be used without cooling up to temperatures of 1200° C., in particular in the hot gas stream of a gas turbine.

Obviously, numerous modifications and variations of the present invention are possible in light of the above teachings. It is therefore to be understood that within the scope of the appended claims, the invention may be practiced otherwise than as specifically described herein.

| LIST OF DESIGNATIONS | |
|---|---|
| 10 | High temperature probe |
| 11 | Probe tube |
| 11a | Tube upper part |
| 11b | Tube lower part |
| 12, 13 | Internal drilled hole |
| 14, 15 | Flow-through channel |
| 16a, b | Constriction |
| 17a | Gas inlet opening |
| 17b | Gas outlet opening |
| 18 | Annular groove |
| 19 | Lead-through |
| 20 | Probe element |
| 20a, b | Ceramic tube |
| 20c | Tube point |
| 21 | Ceramic bead |
| 22a, b | Sheathing |
| 23 | Lead-through tube |
| 24 | Direct welded connection |
| 25 | Extension wires |
| 26 | Measurement transducer |
| 27 | Flange |
| 28 | Sealing ring |
| 29 | Hot gas space |
| 30 | Wall |
| 31, 32 | Thermocouple |
| 33 | Hot gas housing |
| 34 | Stop (annular) |
| 35 | Bayonet lock |
| 36 | Spring |
| 37 | Plenum |
| 38 | Turbine housing |
| 39 | Protective tube |
| 40, 45 | Probe opening |
| 41 | Protective tube |
| 42 | Insert |
| 43 | Lid |
| 44 | Lead-through |
| 46 | Sheathing |
| 47 | Connection point (thermocouple) |
| DM | External diameter (ceramic tube 20b) |
| W | Internal width (flow-through channel) |

What is claimed as new and desired to be secured by Letters Patent of the United States is:

1. A high temperature probe for use in the hot gas stream of a gas turbine at temperatures of up to 1200° C., comprising a metallic probe tube having an internal drilled hole running in the direction of the tube axis of the probe tube and a measurement space arranged at the lower end, which space is separated from the internal drilled hole by a constriction and is in contact with the surroundings of the probe tube, and also at least one thermocouple which is conducted to the measurement space in an insulated manner in the internal drilled hole and through the constriction into the measurement space, wherein the measurement space is configured as a flow-through channel for the hot gases to be measured, which channel is oriented at right angles to the direction of the tube axis and runs through the probe tube with an internal width (W), and wherein the at least one thermocouple is arranged with its connection point within the flow-through channel.

2. A high temperature probe as claimed in claim 1, wherein the flow-through channel is bounded at the sides by walls of the probe tube, which walls form a radiation protection shield.

3. A high temperature probe as claimed in claim 2, wherein the at least one thermocouple is conducted to the measurement space in the internal drilled hole of the probe tube in a first ceramic tube provided with appropriate through holes, with the connection point of the thermocouple being located at the lower end of the first ceramic tube, and wherein the first ceramic tube projects through the constriction into the flow through channel.

4. A high temperature probe as claimed in claim 3, wherein the external diameter (DM) of the first ceramic tube is significantly smaller than the internal width (W) of the flow-through channel.

5. A high temperature probe as claimed in claim 4, wherein the first ceramic tube is concentrically surrounded above the constriction by a second, hollow-cylindrical ceramic tube.

6. A high temperature probe as claimed in claim 3, wherein the at least one thermocouple is a ptRh thermocouple, and wherein means are provided for oxygen to flow around the at least one thermocouple in the part above the constriction during use of the high temperature probe.

7. A high temperature probe as claimed in claim 3, wherein at least that part of the first ceramic tube and of the at least one thermocouple around which the hot gas flows is surrounded by a sheathing of PtRh.

8. A high temperature probe as claimed in claim 1, wherein the probe tube comprises an oxide-dispersion-strengthened (ODS) superalloy based on iron and having a high chromium and aluminum content.

9. A high temperature probe as claimed in claim 1, wherein, for redundancy reasons, there are arranged in the probe at least two thermocouples parallel to one another.

10. A high temperature probe as claimed in claim 2, wherein the probe tube comprises an oxide-dispersion-strengthened (ODS) superalloy based on iron and having a high chromium and aluminum content.

11. A high temperature probe as claimed in claim 5, wherein the first or second ceramic tube comprises an $Al_2O_3$ ceramic.

12. A high temperature probe for use in the hot gas stream of a gas turbine at temperatures of up to 1200° C., comprising a metallic probe tube having an internal drilled hole running in the direction of the tube axis of the probe tube and a measurement space arranged at the lower end thereof, which is separated from the internal drilled hole by a constriction and is in contact with the surroundings of the probe tube, and also at least one thermocouple which is conducted to the measurement space in an insulated manner in the internal drilled hole and through the constriction into the measurement space, wherein the measurement space is configured as a flow-through channel for the hot gases to be measured, which channel is oriented at right angles to the direction of the tube axis and runs through the probe tube with an internal width, and wherein the at least one thermocouple is arranged with its connection point within the flow-through channel, wherein the at least one thermocouple is a PtRh thermocouple, and wherein means are provided for oxygen to flow around the at least one thermocouple in the part above the constriction during use of the high temperature probe.

13. A high temperature probe as claimed in claim 12, wherein the means comprise a gas inlet opening arranged in the upper part of the probe tube and a gas outlet opening arranged just above the constriction, which two openings connect the internal drilled hole of the probe tube with the respective exterior space of the probe tube.

14. A high temperature probe as claimed in claim 12, wherein the flow-through channel is bounded at the sides by walls of the probe tube, which walls form a radiation protection shield.

15. A high temperature probe as claimed in claim 14, wherein the at least one thermocouple is conducted to the measurement space in the internal drilled hole of the probe tube in a first ceramic tube provided with appropriate through holes, with the connection point of the thermocouple being located at the lower end of the first ceramic tube, and wherein the first ceramic tube projects through the constriction into the flow-through channel.

16. A high temperature probe as claimed in claim 15, wherein the external diameter of the first ceramic tube is significantly smaller than the internal width of the flow-through channel.

17. A high temperature probe as claimed in claim 16, wherein the first ceramic tube is concentrically surrounded above the constriction by a second, hollow-cylindrical ceramic tube.

18. A high temperature probe as claimed in claim 17, wherein the first or second ceramic tube comprises an $Al_2O_3$ ceramic.

19. A high temperature probe as claimed in claim 12, wherein the probe tube comprises an oxide-dispersion-strengthened (ODS) superalloy based on iron and having a high chromium and aluminum content.

* * * * *